(12) United States Patent
Smith

(10) Patent No.: US 12,326,131 B2
(45) Date of Patent: Jun. 10, 2025

(54) SYSTEMS AND METHODS FOR HARNESSING MARINE HYDROKINETIC ENERGY

(71) Applicant: Riahmedia Inc., San Marcos, CA (US)

(72) Inventor: Earnest Smith, San Marcos, CA (US)

(73) Assignee: Riahmedia Inc., San Marcos, CA (US)

( * ) Notice: Subject to any disclaimer, the term of this patent is extended or adjusted under 35 U.S.C. 154(b) by 134 days.

(21) Appl. No.: 18/020,855

(22) PCT Filed: Aug. 11, 2021

(86) PCT No.: PCT/US2021/045605
§ 371 (c)(1),
(2) Date: Feb. 10, 2023

(87) PCT Pub. No.: WO2022/036000
PCT Pub. Date: Feb. 17, 2022

(65) Prior Publication Data
US 2023/0304466 A1     Sep. 28, 2023

Related U.S. Application Data

(60) Provisional application No. 63/179,897, filed on Apr. 26, 2021, provisional application No. 63/064,769, filed on Aug. 12, 2020.

(51) Int. Cl.
*F03B 13/06*     (2006.01)
*F03B 13/26*     (2006.01)

(52) U.S. Cl.
CPC ............ *F03B 13/06* (2013.01); *F03B 13/264* (2013.01); *F05B 2240/97* (2013.01);
(Continued)

(58) Field of Classification Search
CPC .... F03B 13/06; F03B 13/264; F05B 2240/97; Y02E 10/20; Y02E 10/30
(Continued)

(56) References Cited

U.S. PATENT DOCUMENTS

| | | |
|---|---|---|
| 3,754,147 A | 8/1973 | Hancock et al. |
| 3,803,422 A | 4/1974 | Krickler |
| (Continued) | | |

FOREIGN PATENT DOCUMENTS

| | | |
|---|---|---|
| WO | 2022/036000 A1 | 2/2022 |
| WO | 2024/151739 A1 | 7/2024 |

OTHER PUBLICATIONS

International Search Report and Written Opinion mailed Nov. 17, 2021 for International Application Serial No. PCT/US2021/045605 filed on Aug. 11, 2021.
(Continued)

*Primary Examiner* — Charles Reid, Jr.
(74) *Attorney, Agent, or Firm* — K&L Gates LLP; Brian J. Novak; Giorgios N. Kefallinos

(57) ABSTRACT

An example system comprises an enclosure submerged in a body of water. The system also comprises an intake port disposed along a periphery of the enclosure to transport water into the enclosure. The system also includes a turbine generator disposed inside the enclosure and coupled to the intake port to receive the water entering the enclosure through the intake port. The system also comprises a water storage tank coupled to the turbine generator to receive the water flowing out of the turbine generator. The system also comprises a pump coupled to the water storage tank to pump the water out of the water storage tank. The system also comprises a controller to control flow of the water into the enclosure by operating the intake port and to control flow of the water out of the enclosure by operating the pump.

16 Claims, 13 Drawing Sheets

(52) U.S. Cl.
CPC ... *F05B 2270/18* (2013.01); *F05B 2270/3011* (2013.01); *F05B 2270/341* (2020.08)

(58) Field of Classification Search
USPC ..................................................... 290/43, 54
See application file for complete search history.

(56) References Cited

U.S. PATENT DOCUMENTS

| | | | |
|---|---|---|---|
| 3,866,396 | A | 2/1975 | Meyer |
| 4,408,452 | A | 10/1983 | Tsunoda |
| 6,114,773 | A | 9/2000 | Kouris |
| 6,833,631 | B2 | 12/2004 | Van Breems |
| 6,982,498 | B2 | 1/2006 | Tharp |
| 6,995,479 | B2 | 2/2006 | Tharp |
| 6,998,730 | B2 | 2/2006 | Tharp |
| 7,042,114 | B2 | 5/2006 | Tharp |
| 7,281,371 | B1 | 10/2007 | Heidenreich |
| 7,352,074 | B1 | 4/2008 | Pas |
| 7,470,086 | B2 | 12/2008 | Jennings et al. |
| 7,471,009 | B2 | 12/2008 | Davis et al. |
| 7,728,454 | B1 | 6/2010 | Anderson, Jr. |
| 7,911,073 | B2 | 3/2011 | Smith |
| 7,911,074 | B2 | 3/2011 | Anderson |
| 7,915,750 | B1 | 3/2011 | Rovinsky |
| 7,938,622 | B2 | 5/2011 | Anderson, Jr. |
| 7,980,832 | B2 | 7/2011 | Ahdoot |
| 8,022,567 | B2 | 9/2011 | Davis et al. |
| 8,164,209 | B2 | 4/2012 | Rovinsky |
| 8,166,760 | B2 | 5/2012 | Fiske |
| 8,174,135 | B1 | 5/2012 | Roe et al. |
| 8,215,104 | B2 | 7/2012 | Riley |
| 8,350,396 | B2 | 1/2013 | Dempster |
| 8,362,631 | B2 | 1/2013 | Roe et al. |
| 8,424,300 | B1 * | 4/2013 | Navarro .................. F04B 17/00 417/331 |
| 8,446,032 | B2 | 5/2013 | Chauvin |
| 8,456,031 | B1 | 6/2013 | Hull et al. |
| 8,497,594 | B2 | 7/2013 | Rajadhyaksha et al. |
| 8,525,363 | B2 | 9/2013 | Rajadhyaksha et al. |
| 8,536,723 | B2 | 9/2013 | Roos |
| 8,558,403 | B2 | 10/2013 | Rooney |
| 8,692,404 | B2 | 4/2014 | Chauvin |
| 8,698,338 | B2 | 4/2014 | Slocum et al. |
| 8,737,558 | B2 | 5/2014 | Fiske |
| 8,749,086 | B2 | 6/2014 | Nanayakkara et al. |
| 8,786,122 | B2 | 7/2014 | Rajadhyaksha et al. |
| 8,928,168 | B2 | 1/2015 | Letang |
| 8,963,356 | B2 | 2/2015 | Roos |
| 8,966,899 | B2 | 3/2015 | Fiske |
| 8,987,932 | B2 | 3/2015 | Nanayakkara et al. |
| 9,022,692 | B2 | 5/2015 | Frazier et al. |
| 9,038,377 | B2 | 5/2015 | Anteau |
| 9,041,235 | B1 | 5/2015 | Hunter et al. |
| 9,051,914 | B1 | 6/2015 | Hanna |
| 9,127,639 | B2 | 9/2015 | Cho et al. |
| 9,139,974 | B2 | 9/2015 | Frazier et al. |
| 9,151,269 | B2 | 10/2015 | Han |
| 9,234,437 | B1 | 1/2016 | Hanna |
| 9,234,494 | B2 | 1/2016 | Anteau |
| 9,234,495 | B2 | 1/2016 | Anteau |
| 9,249,783 | B2 | 2/2016 | Selsam |
| 9,441,606 | B2 | 9/2016 | Hanna |
| 9,453,492 | B2 | 9/2016 | Letang |
| 9,476,401 | B2 | 10/2016 | Han |
| 9,556,848 | B2 | 1/2017 | Lin et al. |
| 9,581,127 | B2 | 2/2017 | Van Rompay |
| 9,797,366 | B2 | 10/2017 | Schmidt-Boecking et al. |
| 10,024,307 | B2 | 7/2018 | Selsam |
| 10,054,103 | B2 | 8/2018 | Lin et al. |
| 10,344,741 | B2 | 7/2019 | Sant et al. |
| 10,364,938 | B2 | 7/2019 | Frazier et al. |
| 10,385,858 | B2 | 8/2019 | Haddad |
| 10,473,084 | B2 | 11/2019 | Van Rompay |
| 10,648,446 | B2 | 5/2020 | Kouris |
| 10,774,806 | B1 | 9/2020 | Lu |
| 10,871,149 | B2 | 12/2020 | Selsam |
| 10,941,747 | B1 | 3/2021 | Bingaman |
| 11,018,554 | B2 | 5/2021 | Vannan, Jr. et al. |
| 12,085,053 | B2 | 9/2024 | Smith |
| 2005/0001432 | A1 | 1/2005 | Drentham Susman et al. |
| 2008/0309089 | A1 | 12/2008 | Lin |
| 2009/0146422 | A1 | 6/2009 | Srybnik et al. |
| 2009/0196769 | A1 | 8/2009 | Davis, Sr. |
| 2009/0230687 | A1 | 9/2009 | Robichaud |
| 2009/0309366 | A1 | 12/2009 | Moore |
| 2010/0007148 | A1 | 1/2010 | Davis et al. |
| 2010/0072754 | A1 | 3/2010 | Huang |
| 2010/0117364 | A1 | 5/2010 | Harrigan |
| 2010/0158705 | A1 | 6/2010 | Guinard |
| 2010/0207394 | A1 | 8/2010 | Leung |
| 2010/0258449 | A1 | 10/2010 | Fielder |
| 2011/0018277 | A1 | 1/2011 | Brace |
| 2011/0101697 | A1 | 5/2011 | Power, III et al. |
| 2011/0204627 | A1 | 8/2011 | Ho et al. |
| 2011/0260460 | A1 | 10/2011 | Rovinsky |
| 2011/0291419 | A1 | 12/2011 | Dunne et al. |
| 2012/0286508 | A1 | 11/2012 | Poddey |
| 2013/0043681 | A1 | 2/2013 | Rivera |
| 2013/0199182 | A1 | 8/2013 | Shifferaw |
| 2013/0200622 | A1 | 8/2013 | Shifferaw |
| 2013/0307272 | A1 | 11/2013 | Smith |
| 2014/0028028 | A1 | 1/2014 | Frye |
| 2014/0219800 | A1 | 8/2014 | Lee |
| 2014/0306454 | A1 | 10/2014 | Lin et al. |
| 2015/0014995 | A1 | 1/2015 | Nishioka |
| 2015/0033722 | A1 | 2/2015 | Layton et al. |
| 2015/0048619 | A1 | 2/2015 | Lin et al. |
| 2015/0198137 | A1 | 7/2015 | Hanna |
| 2015/0292471 | A1 | 10/2015 | Kithil et al. |
| 2015/0354528 | A1 | 12/2015 | Van Rompay |
| 2016/0084219 | A1 | 3/2016 | Owen |
| 2016/0160835 | A1 * | 6/2016 | Abu-Al-Rubb ......... F03B 13/00 416/85 |
| 2016/0237983 | A1 | 8/2016 | Hayman |
| 2018/0010569 | A1 | 1/2018 | Lin et al. |
| 2018/0355835 | A1 | 12/2018 | Lee |
| 2019/0085814 | A1 | 3/2019 | Bee |
| 2020/0063708 | A1 | 2/2020 | Grigg |
| 2020/0095985 | A1 | 3/2020 | Anteau |
| 2021/0071632 | A1 | 3/2021 | Gudesen |
| 2021/0148327 | A1 | 5/2021 | Anteau |
| 2022/0060009 | A1 | 2/2022 | Godreau et al. |

OTHER PUBLICATIONS

International Search Report and Written Opinion, mailed May 30, 2024 for International Application Serial No. PCT/US2024/011055 filed Jan. 10, 2024.

* cited by examiner

SYSTEMS AND METHODS FOR HARNESSING MARINE HYDROKINETIC ENERGY

RELATED APPLICATIONS

This application is a national phase filing of PCT/US2021/045605, filed on Aug. 11, 2021. Which claims priority from U.S. Prov. App. No. 63/064,769 filed on Aug. 12, 2020 and U.S. Prov. App. No. 63/179,897 filed on Apr. 26, 2021, the entirety of each of which is incorporated herein by reference.

FIELD

This invention generally relates to power systems and more particularly to systems and methods for harnessing marine hydrokinetic energy.

BACKGROUND

Power generation and energy storage technologies are continuously evolving to accommodate our ever increasing demand for electricity.

Some power systems rely on non-renewable energy sources, such as coal, natural gas, nuclear fuel, petrochemicals, and other fuels, to generate a predictable amount of power when needed by increasing or decreasing the amount of fuel input into the system according to energy demand at any given time. However, such power systems may also be associated with significant or unpredictable financial costs (e.g., due to fuel market price fluctuations, fuel extraction and mining costs, etc.) as well as environmental costs (e.g., carbon emissions, damage caused by mining operations, etc.).

Some power systems mitigate or avoid these disadvantages by instead relying on renewable energy sources, such as solar energy (e.g., solar cell systems), wind energy (e.g., wind turbine systems), etc., which are generally more abundant and can usually be harvested without causing as much damage to the environment compared to fuel sources. However, there are also other technical challenges associated with harnessing renewable energy efficiently. For example, some renewable energy systems passively collect energy at less predictable times and/or rates depending on the current state of their surrounding environment. For instance, power output by a solar power system (e.g., photovoltaic cells) or a wind power system at any given time will vary depending on the current weather conditions (e.g., cloudy vs. clear sky, local wind speeds, etc.) in their surrounding environment.

Hydrokinetic energy is another type of renewable energy source, and is generally the energy that drives the movement of bodies of water. Tides, waves, ocean currents, and free-flowing rivers contain vast amounts of largely untapped, powerful, and clean hydrokinetic energy. Natural bodies of water can store immense amounts of hydrokinetic energy over time due to the thermal energy of the sun's heat and the mechanical energy exerted by the gravitational pull of the moon and the sun.

Traditional hydropower systems can sometimes be used to generate electricity efficiently (when needed). For example, a river can be dammed to accumulate the hydrokinetic energy of its flowing water by filling a reservoir behind the dam to convert it into potential energy. The stored water can then be released from the reservoir selectively (when needed) through a water turbine in a controllable manner (e.g., by controlling the rate of water flow through the water turbine) to generate an electricity signal having desired characteristics. However, hydropower dams may be less suitable or practical in some geographic locations (e.g., where there is no nearby river, or when the surrounding terrain is not ideal for damming a deep reservoir). Additionally, damming a river may sometimes result in other types of environmental harm, safety risks (e.g., flooding, etc.), and/or interfere with the use of the adjacent lands. Moreover, such traditional inland hydropower systems may not be suitable for harnessing the even more massive amounts of hydrokinetic energy stored in other bodies of water, such as oceans and seas.

The present disclosure is directed to power systems that provide significant advantages and capabilities over prior art power systems of the type discussed above.

SUMMARY

The present disclosure provides systems, methods, and apparatus that enable producing and/or storing electrical power efficiently by way of harnessing hydrokinetic energy at high pressure underwater environments.

In an example, a system is provided that includes an enclosure submerged in a body of water. The system also includes an intake port disposed along a periphery of the enclosure to transport water into the enclosure. The system also includes a turbine generator disposed inside the enclosure and coupled to the intake port to receive the water entering the enclosure through the intake port. The system also includes a water storage tank coupled to the turbine generator to receive the water flowing out of the turbine generator. The system also includes a pump coupled to the water storage tank to pump the water out of the water storage tank. The system also includes a controller to control flow of the water into the enclosure by operating the intake port and to control flow of the water out of the enclosure by operating the pump.

In another example, a system is provided that includes an enclosure submerged in a body of water. The system also includes an intake port disposed along a periphery of the enclosure to transport water into the enclosure. The system also includes a turbine generator disposed inside the enclosure and coupled to the intake port to receive the water entering the enclosure through the intake port. The system also includes a discharge port disposed along the periphery of the enclosure to transport the water exiting the turbine generator out of the enclosure. The system also includes a controller to control flow of the water into the enclosure by operating the intake port.

Additional features and advantages of the disclosed systems, apparatus, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

DETAILED DESCRIPTION

Figure 1:
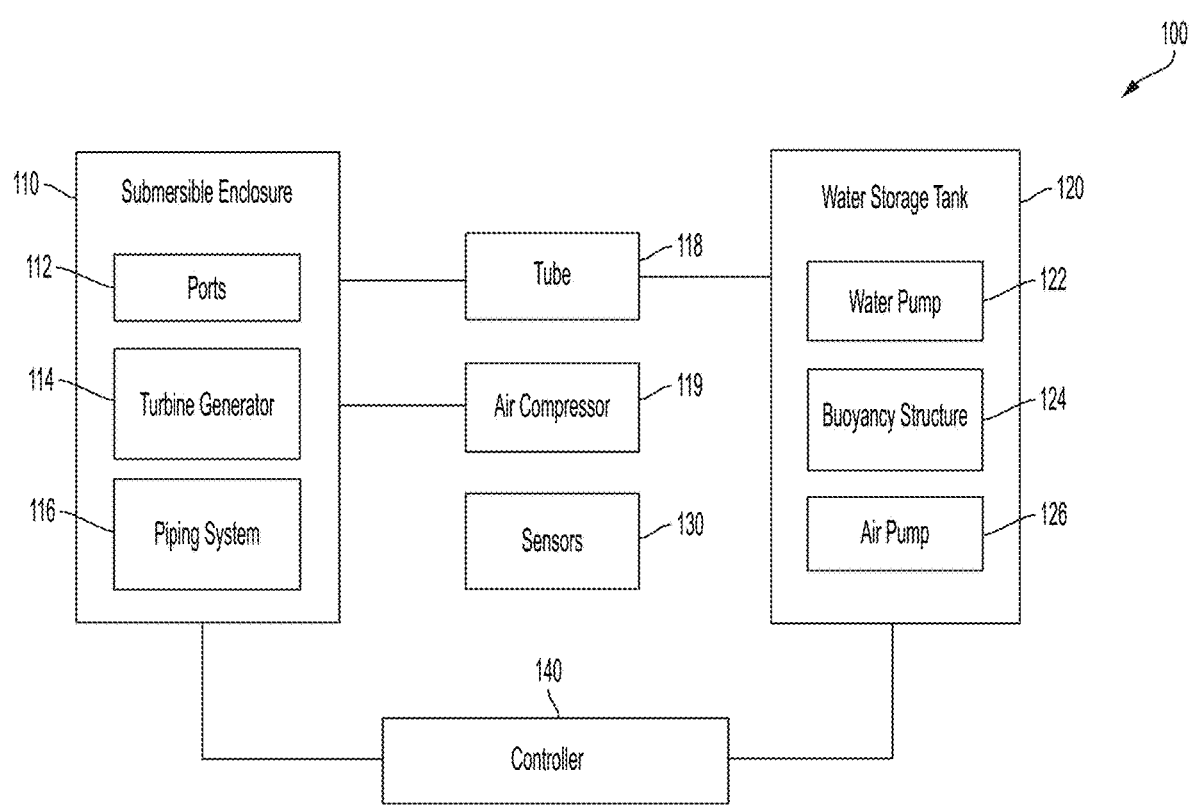
FIG. 1 is a block diagram of an example power system, according to an example embodiment of the present disclosure.

Oceans and seas have vast amounts of untapped hydrokinetic energy, including tidal energy sufficient to drive massive tidal waves across our planet every day. Oceans also store huge amounts of gravitational potential energy as evidenced by the immense pressures in deep ocean waters. For example, water pressures at the average ocean depth of about 12,100 feet can be approximately 5,239 pounds per square inch (PSI). As another example, some oil industry rigs deployed today include: Auger Platform, seabed depth 2,720 feet, ocean pressure 1,177 PSI; Mars Platform, seabed depth 2,940 feet, ocean pressure 1,273 PSI; Horn Mountain Platform, seabed depth 5,422 feet, ocean pressure 2,347 PSI; Perdido Platform, seabed depth 8,040 feet, ocean pressure 3,481 PSI. In general, seabed or ocean floor underwater pressures at many different locations are suitable for various applications of the example power systems of the present disclosure.

The present disclosure includes example systems and methods for harnessing marine hydrokinetic energy to enable or improve various power applications (e.g., power generation, power conversion, energy storage, etc.). The systems and methods described herein are not limited to harnessing energy at ocean depths, but can also include harnessing energy at depths of other bodies of water such as, but not limited to, rivers, seas, lakes, etc.

FIG. 1 is a block diagram of an example embodiment of a power system 100, according to the present disclosure. In the illustrated example, the system 100 includes a submersible enclosure 110, a tube 118, an air compressor 119, a water storage tank 120, a plurality of sensors 130, and a controller 140.

The enclosure 110 defines a sealed low pressure environment (e.g., air, vacuum, etc.) configured to be submerged under water at various depths such that water pressure outside the enclosure 110 is substantially greater than pressure inside the enclosure. In some examples, the enclosure 110 has a spherical shape, a cylindrical shape, or any other shape suitable to withstand the pressure differential between the water surrounding the enclosure 110 (e.g., when submerged underwater) and the low pressure environment inside the enclosure 110.

In some examples, the enclosure 110 can be a main structure of the system 100. For example, the enclosure 110 can be configured as an underwater power plant. In some examples, enclosure 110 is mounted to a seabed. In other examples, the enclosure 110 is deployed at different depths between the seabed and the surface of the body of water in which the enclosure 110 is submerged. In some examples, the enclosure 110 may include compressed air storage tanks, water storage tanks, or any other component required to operate the enclosure 110 as a submarine, such as ballast tank(s), variable ballast tank(s), trim tank(s), vent valve(s), a pressure hull and/or any other component suitable for operating the enclosure 110 as a remotely piloted submarine. For example, the enclosure 110 can be operated remotely (e.g., using the controller 140) to move the enclosure upwards or downwards to different sea levels or depths.

In some examples, the enclosure 110 can include one or more compartments, and each compartment can be pressurized or non-pressurized.

In some examples, the system 100 includes more than one enclosure 110 submerged under the same body of water and arranged at different positions relative to one another.

In the illustrated example, the enclosure 110 includes a plurality of ports 112, a turbine generator 114, and a piping system/mechanism 116.

The plurality of ports 112 are disposed along a periphery of the enclosure 110 to define channels through which water can flow into or out of the enclosure 110. To that end, in some examples, a port 112 includes a valve 112 (e.g., pressure valve, a vent valve, etc.), a nozzle 112, a waterjet 112, combinations thereof, and/or any other component that is operable to allow, prevent, or adjust a flow of water into or out of the enclosure 110 at the port. For example, a valve 112 can be used to increase or decrease the flow of water transported into or out of the enclosure 110 by at least partially closing or opening the valve. In some examples, one or more ports 112 are intake port(s) 112 or inlet(s) 112 that transport water, compressed air, or any other fluid into the enclosure 110. In some examples, one or more ports 112 are discharge port(s) 112 or outlet(s) 112 that transport water, air, or any other fluid out of the enclosure 110.

In some examples, the plurality of ports 112 are arranged at different positions along the periphery of the enclosure 110 and/or oriented in a plurality of directions relative to a body of water surrounding the enclosure 110. For example, where the enclosure 110 has a spherical shape, each port 112 may transport water from a different direction relative to the body of water depending on the position of the port on the enclosure 110.

Thus, in some examples, the ports 112 include one or more intake valves, outlet valves, or a combination thereof. In some examples, the ports 112 include water intake valves, water outlet valves, air intake valves, air outlet valves, or a combination thereof. The valves can be Penstock Pipe or composed of a Penstock type pipe. In other embodiments, on/off stop valves 112 can be placed near intake valves, outlet valves, or a combination thereof.

The turbine generator 114 is disposed inside the disclosure (e.g., in the low pressure environment) and coupled to an intake port 112 to receive water entering the enclosure 110 through the intake port. The received water may flow through the turbine to cause the turbine to generate power (e.g., by rotating turbine blades, etc.). The turbine generator 114 is also coupled to the water storage tank 120. Thus, the system 100 directs water flowing out of the turbine generator 114 into the water storage tank 120. In this way, the generator 114 can continue to generate power based on the pressure differential between the high pressure water outside the enclosure 110 and the low pressure environment inside the enclosure 110 (e.g., by using the water storage tank 120 to hold the spent water flowing out of the generator 114).

Turbine generator 114 may include any type of turbine generator, such as a Francis turbine, a Pelton turbine, a Kaplan turbine, a Deriaz turbine, a Jonval turbine, a Cross turbine, a reaction type turbine, an impulse type turbine, or any other type of turbine. The turbine generator 114 can be mounted vertically, horizontally, or in any suitable orientation depending on an application of the system 100.

The piping system 116 is disposed inside the enclosure 110 and configured to couple an inlet of the turbine generator 114 to an intake port of the ports 112 and/or to couple an outlet of the turbine generator 114 with the water storage tank 120. To that end, in some examples, the piping system or mechanism 116 includes one or more pipes (e.g., internal pipes) disposed inside the enclosure 110. As an example, the piping system 116 may include pipes connected to intake valve(s) or nozzle(s) or port(s) 112, which may be penstock pipes or other types of pipes capable of transporting high pressure water from the intake valve(s) or nozzle(s) or port(s) 112 to the turbine 114. Additionally or alternatively, as another example, the piping system 116 may include pipe(s) connected to the turbine 114 to transport spent water flowing out of the turbine generator 114 to the water storage tank 120 and/or pipes to transport the spent water out of the enclosure 110 via a discharge port(s) or outlet(s) or valve(s) 112. Additionally or alternatively, in some examples, the system 100 includes one or more external pipes (not shown) disposed outside the enclosure 110. For example, the external pipes may transport water between the enclosure 110 and another enclosure (not shown). As another example, the external pipes may transport water between the enclosure 110 and the water storage tank 120.

The tube 118 may include any type of tube connected to a port 112 and formed from a structure that can transport high pressure fluids (e.g., high pressure water, compressed air, etc.) into or out of the enclosure 110 via the port 112. As an example, the tube 118 may be coupled to a discharge port or valve 112 and may extend away from the discharge port 112 to define a channel for transporting water (flowing out of the enclosure 110 at the discharge port 112) to the water storage tank 120. As another example, the tube 118 may alternatively include a tube that transports high pressure air (or compressed air) into an intake port 112 of the enclosure 110. As another example, the tube 118 may alternatively be arranged to transport water from a discharge port 112 of the enclosure 110 to a surface of the body of water in which the enclosure 110 is submerged. In another example, the tube 118 can alternatively be arranged to transport water from the water storage tank 120 to the surface of the body of water.

The air compressor 119 includes any type of air compressor. In some examples, the air compressor 119 is configured to deliver compressed air (or high pressure air) into the enclosure 110 and/or the water storage tank 120. In an example, the air compressor 119 is coupled to an intake port 112 to provide compressed air entering the enclosure. To that end, the air compressor 119 can be submerged inside the body of water (e.g., near the intake port) or disposed outside the body of water (e.g., on a surface vessel or an onshore platform).

Alternatively or additionally, in some examples, the air compressor 119 can be employed as an air vent 222 that pumps air out of the enclosure 110 and/or the water storage tank 120.

In some examples, the air compressor 119 can provide higher pressure air even at high pressure ocean depths. For example, the air compressor 119 can be employed to pump water exiting the enclosure 110 at a discharge port 112 toward the water storage tank 120 and/or toward a surface vessel or onshore platform.

The water storage tank 120 is coupled to the turbine generator 114 to receive (and store) the water flowing out of the turbine generator 114 (e.g., spent water).

In some examples, the water storage tank 120 is disposed outside the enclosure 110. For example, the water storage tank 120 may be coupled to a discharge port 112 of the enclosure 110 via the tube 118 to receive water flowing out of the enclosure 110 through the discharge port 112. Thus, in this example, the tube 118 may define a channel or passageway for transporting the discharged water from the enclosure 110 to the water storage tank 120. In other words, the water storage tank 120 can be connected/attached to the enclosure 110. In other examples, the water storage tank 120 is disposed inside the enclosure 110. For example, the water storage tank 120 may be a component of the enclosure 110. In other examples, the enclosure 110 and the water storage tank 120 are a single structure. For example, the enclosure 110 can store the water exiting the turbine generator 114 inside the enclosure 112 instead of discharging it out of the enclosure 110 to the water storage tank 120.

In some examples, the storage tank 120 receives water from the enclosure 110 (via the tube 118) at a relatively lower flow rate or gallons per minute (GPM), and discharges water out of the storage tank 120 at a relatively higher flow rate or GPM rate. For example, the storage tank 120 can be configured to discharge water at a same or faster rate than the water flowing into the storage tank 120 to avoid reaching a full capacity. The storage tank 120 can be pressurized or non-pressurized.

In the illustrated example, the water storage tank 120 includes a water pump 122, a buoyancy structure 124, and an air pump 126.

The water pump 122 is configured to pump water out of the water storage tank 120 (e.g., back to the body of water in which the enclosure 110 and/or the storage tank 120 is submerged).

The water pump 122 can be disposed inside or outside the water storage tank 120. In an example, the water pump 122 is located on a vessel floating on the body of water in which the water storage tank 120 is submerged. More generally, the water pump 122 can be used to discharge water from the water storage tank 120 or from the enclosure 110 (e.g., via outlet valves or ports 112). In other embodiments, the water pump 122 can discharge water toward an ocean or ship-based turbine generator 114.

The buoyancy structure 124 may include ballast tanks, balloons, and/or any other structure disposed inside or coupled outside the water storage tank 120. The buoyancy structure 124 is configured to receive air (pumped by the air pump 126) to increase buoyancy forces exerted on the water storage tank 120. For example, air pump 126 may pump the air into a ballast tank 124 to reduce a density of the water storage tank 120 relative to the density of surrounding water. In this way, the water storage tank 120 may rise to a lower ocean depth where discharging water stored in the storage tank 120 does not require a same amount of energy as when the water storage tank was at a greater ocean depth. Thus, the air pump 126 can include any type of air pump suitable for pumping air into the buoyance structure.

The sensors 130 include pressure sensors and/or underwater current sensors. In some examples, the sensors 130 include a pressure sensor disposed at or near the water storage tank 120 to provide measurements of water pressure outside the water storage tank 120. For example, the pump 122 can be operated (e.g., via the controller 140) to adjust the flow of water pumped out of the water storage tank 120 depending on the measurements by the pressure sensor 130. For example, if the pressure is lower than a threshold pressure (e.g., due to the water storage tank 120 moving up to a threshold depth level from a surface of the body of water, due to a low tide event at the location of the storage tank 120 when the pressure sensor measured the pressure, etc.).

In some examples, the sensors 130 include an underwater current sensor or other type of sensor that provides measurements indicative of a direction of an underwater current at or near a location of the enclosure 110. In these examples, the system 100 can be configured to select an intake port 112 (e.g., oriented opposite to a direction of the underwater current), and then route water from the selected intake port 112 (e.g., by operating the piping mechanism 116) into the turbine generator 114. In this way, the system 100 advantageously receives water having more hydrokinetic energy because the selected intake port 112 will be receiving the high pressure water in alignment with a natural direction of water flow in the underwater current.

The controller 140 is configured to regulate and/or control the flow of water into and/or out of the enclosure 110 and/or the storage tank 120. To that end, the controller 140 may include a computer that has hardware and/or software executable to control the system 100 in accordance with the present disclosure. For example, the computer 140 may include one or more processors and a memory device (e.g., a non-transitory computer readable medium) storing instructions that, when executed by the one or more processors, cause the computer 140 to perform the functions described herein. Alternatively or additionally, the controller 140 may include digital and/or analog circuitry wired to perform the functions of the controller 140 described herein.

The controller 140 may be configured to control flow of water into the enclosure 110 by operating an intake port 112 of the enclosure 110 (e.g., by switching an intake port or valve 112 to allow, prevent, or adjust the rate at which the water is flowing in). Similarly, the controller 140 may also be configured to control flow of water out of the enclosure 110 and/or the water storage tank 120.

In an example, the controller 140 increases a buoyancy force exerted on the water storage tank 120 by operating the air pump 126 to pump air into the buoyancy structure 124. By increasing the buoyancy force, the controller 140 in this example may thus cause the water storage tank 120 to move upwards toward a surface of the body of water in which the water storage tank 120 is submerged. In this example, the controller 140 can optionally delay or slow down the rate at which water is being pumped out of the water storage tank 120 until the water storage tank 120 reaches a surface of the body of water or at least a threshold depth level (e.g., where water pressure is relatively lower) before starting or increasing the rate at which water is being pumped out of the water storage tank 120. In this way, energy needed to pump the spent water out of the water storage tank 120 can be reduced.

In an example, the controller 140 is configured to adjust flow of the water pumped out of the water storage tank 120 (and/or into the enclosure 110) based on a tidal phase of the body of water (in which the tank 120 is submerged) at a location of the water storage tank 120 and/or the enclosure 110.

In general, tidal waves have very long wavelengths (e.g., miles or tens or miles) such that, at any particular location in the ocean, high tides and low tides occur in a predictable manner (e.g., approximately every 6 hours, 12 hours, etc.). Thus, the controller 140 can start pumping and/or increase the rate at which water is being pumped out of the storage tank 120 during times when the tidal phase is at or near a low tide. Similarly, the controller 140 can start or increase the rate at which water is being transported into the enclosure 110 when the tidal phase is at or within a threshold from a high tide (e.g., when the sea level above the enclosure 110 is slightly higher than average due to the tidal forces exerted on the oceans by the moon and/or the sun).

Thus, the example systems herein advantageously enable harnessing tidal energy by selectively allowing water into the enclosure 110 and/or the storage tank 120 during high tides (when the water level is relatively higher), and/or by delaying the timing or rate of pumping water out of the water storage tank 120 until a low tide condition occurs (i.e., when the water level above the storage tank 120 is relatively lower) to harness the pressure differential between the high tide and the low tide.

Notably, the example systems herein also advantageously improves the efficiency of harvesting tidal wave energy, by using the high pressure environment at the ocean depths to more effectively transport large amounts of water through the turbine 114 during the high tide phase. For example, if the turbine was instead closer to the surface of the body of water, a relatively smaller amount of water will flow through the turbine 114 during the high tide phase. Accordingly, the example systems herein provide a significant advantage over traditional systems by efficiently harnessing one of the relatively more challenging but very abundant sources of marine hydrokinetic energy.

In some embodiments, the system 100 can be deployed at ocean depths far above a seabed or on the seabed. Options can be tethered to power distribution center(s), electrical grid(s), ocean vessel(s) and or rig(s), ship(s), boat(s), yachts (s), vehicle(s) in order to deliver electrical energy.

In some embodiments, the enclosure 110 can be configured as an ocean vessel including a propulsion system for navigation and positioning the enclosure 110 at sea depths. In some embodiments, the enclosure 110 can employ submarine components required to remotely pilot the enclosure 110 to a suitable location The suitable location, for example, can include, but is not limited to, land, or another part of the ocean.

In other embodiments, the enclosure 110 can be deployed inside a vessel as an electric energy power source for the vessel. In some embodiments, the vessel can be a submarine.

In some embodiments, the system 100 can include a substance (e.g., inside the enclosure 110 or inserted into the enclosure 110 at an intake port 112) to increase the pressure of water flowing through and rotating the turbine generator 114. The substance can be a liquid, a gas, an additive, plasma, the like, or a combination thereof.

In some embodiments, the system 100 includes cables. The cables can be submarine cables. In some embodiments, cables and submarine cables can be employed. The cables can deliver the electrical energy to the industry. It can be electrical power, and signal cables for operation.

In some embodiments, the system 100 can include one or more vessels. Vessels can include, but are not limited to, a rig, a ship, a yacht, a submarine, a vehicle, a boat, a combination thereof, or any type of ocean vessel.

In some embodiments, the system 100 includes a transmission gear box to increase the production of electricity. Transmission gear boxes utilized in the renewable energy industry can be employed.

In some embodiments, the system 100 can include transformer(s), control room(s), computer(s) 140, and/or battery storage unit(s), or a combination thereof. In other embodiments, the systems can include transformer(s), control room(s), robotic(s), automation, computer(s) 140, and/or battery storage unit(s), or a combination thereof, whether within the system 100, outside the system 100, or near the system 100, or in the sea depths, or placed on land. In other embodiments, the system 100 can include accommodations for human habitation for periods of time, such as oxygen supply, sleeping quarters, kitchen, bathrooms, showers, storage area, living quarters, and is not limited to the list herein can be interchangeable and employed in the system 100.

In some embodiments, the system 100 can include a power distribution center configured to process raw electricity to be distributed to an electrical grid. The electrical grid can power one or more cities.

It should be appreciated that the system 100 can alternatively include fewer or more components than those shown, and/or one or more of the components shown can be alternatively implemented as a single structure that performs the combined functions of the one or more components.

For example, in various embodiments, the system 100 can comprise one or more enclosures 110, one or more vessels, one or more power distribution centers, one or more storage tanks 120, one or more intake valves 112, one or more outlet valves 112, one or more pressure valves, one or more turbine generators 114, one or more transmission gears, one or more water pumps 122, one or more computers 140, one or more motors, one or more tubes 118, electronics, a mount, and/or one or more air compressors 119. In some embodiments, the system 100 includes hardware and/or software commonly used in marine hydrokinetic electrical energy systems.

Figure 2:
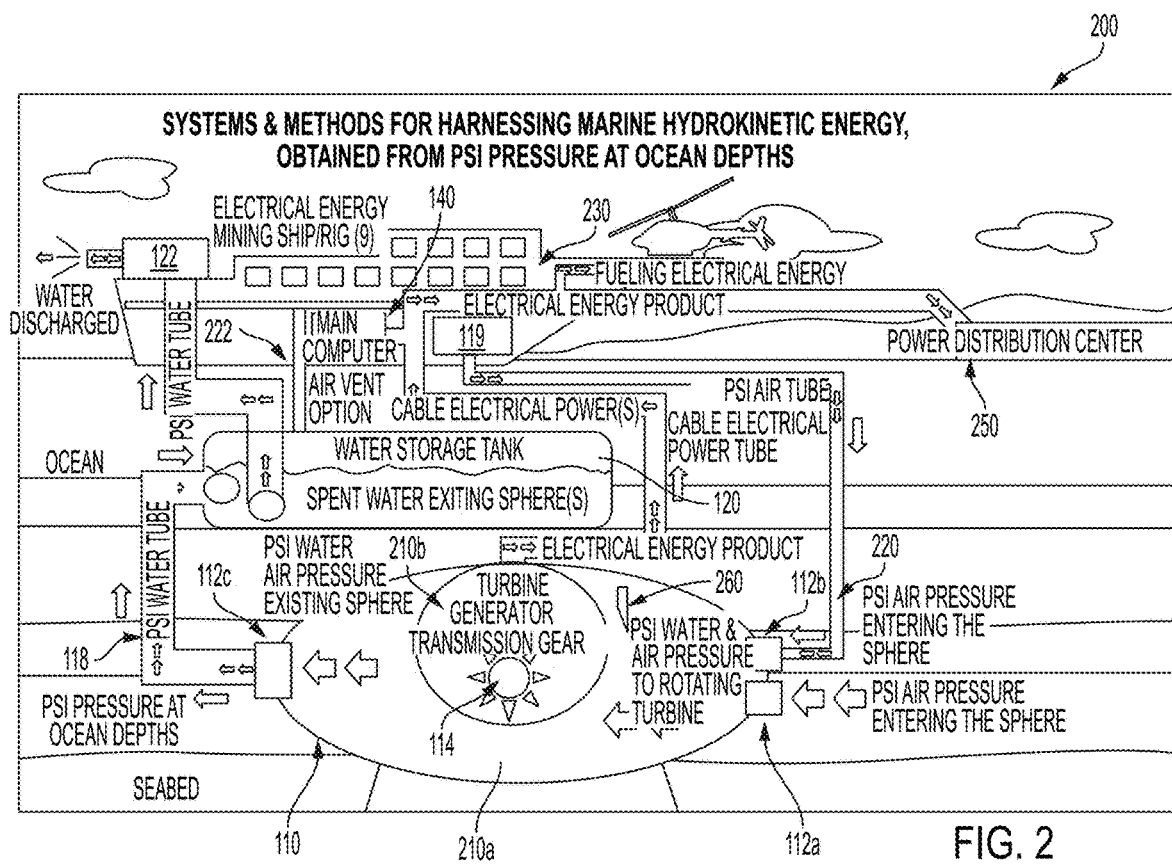
FIG. 2 illustrates an alternate embodiment of an example power system, according to the present disclosure.

FIG. 2 illustrates an alternate embodiment 200 of an example power system, according to the present disclosure.

In some embodiments, the enclosure 110 can have any shape, such as the shape shown in FIG. 2 or another shape, that concludes as a sealed device configured to prevent high pressure water and/or air from escaping, except through intake valves 112*a*, 112*b* or outlet valve 112*c* (collectively referred to as ports 112) that control high pressure water and/or air flow into or out of the enclosure 110. In other embodiments, the enclosure 110 can have one or more main compartments and options for smaller compartments. In the illustrated example of FIG. 2, the enclosure 110 includes two main compartments 210*a*, 210*b*. The main compartment 210*b* can include the turbine generator 114, valve(s), and/or gear boxes(s), power transmission, computer, and/or other electronics required to operate the system 200. In this example, the other main compartment 210*a* can include the high pressure water flow used to rotate blades of the turbine generator 114.

The enclosure 110 can include one or more turbine generators, one or more valves and/or one or more gear boxes, and a power transmission and/or electronics required to operate the system 200. Outside the enclosure 110, covering the intake 112*a* is an optional baffle to prevent wildlife (e.g., fish) from blocking the intake 112*a*. The turbine generator(s) 114, valve(s), gear box(es), power transmission, computer, and or electronics can be placed in a controlled pressurized compartment 110*b* within the enclosure 110. The turbine generator blades can be exposed to high pressure water flow for rotation inside the enclosure 110. In some embodiments, the system 200 includes a tube 220 supplying high air pressure from vessel 230 to the enclosure 110. The air supply can be used to operate the enclosure 110 and regulate the proper pressure in the water flow compartment 210*b* of the enclosure 110. In other embodiments, the enclosure 110 can be deployed at 1,000 feet ocean depth and the PSI can be 433, a higher PSI can be necessary to get the flow of water to the sea surface. Thus, added air pressure of PSI 200 to reach PSI 633, which is greater at the deployed sea level depth of 1,000 feet can be employed.

In other embodiments, high pressure water can enter the enclosure 110 through an intake valve 112*a* and rotate the turbine generator 114 to produce electricity. The electricity can then be sent to the vessel 230 for distribution to an electrical grid 240 by way of one or more electrical cables 250.

In some embodiments, the enclosure 110 can employ one or more stop valves 260 to be used as emergency turn on/off lever(s) controlling high pressure water flow. The electricity can be produced by hydrokinetic energy obtained from water pressure at ocean depths, rotating the turbine generator 114.

Once high pressure water exits the enclosure 110 through the exit valve 112*c*, it can enter the tube and/or pipe 118 that can deliver high pressure water to the water storage tank 120 on its way to vessel 230. High pressure water can be extracted from the water storage tank 120 using a water pump 122. Exiting high pressure water can be routed to the vessel 230 and/or connected to an on board turbine generator or water pump.

In some embodiments, the enclosure 110 can be mounted to the seabed (ocean floor) and/or tethered to a vessel 230 at the ocean's surface.

Enclosures 110 can be deployed in ocean(s), sea(s), river(s), lake(s), manmade lakes(s) and any body of water. In some embodiments, sphere enclosures can operate in water depths and land holes filled with water at depths. In other embodiments, water pressure at ocean depths can be the main ingredient required to produce hydrokinetic electrical energy.

The enclosure 110 can be composed of any suitable material used in the hydrokinetic energy industry. Water pressure, other liquids pressure, and/or pressurized air can be used for operations in the system 200.

In some embodiments, the enclosure 110 can employ one or more motors with thrust propulsion used to maneuver the enclosure 110 into a proper position to operate at sea depths.

The enclosure 110 can employ one or more air tubes 220 from the enclosure 110 to the vessel 230. The enclosure 110 can be designed to supply air pressure when required for operations and maintenance.

The enclosure 110, in the illustrated example of FIG. 2, can produce electricity by way of hydrokinetics energy, obtained from water pressure at ocean depths. In some embodiments, the system 200 comprises the enclosure 110 with intake 112*a* for high pressure water to enter the enclosure 110. The flow of high pressure water can rotate turbine generator(s) 114, which can produce electricity and send it to the water storage tank 120 then to the vessel 230. The vessel 230 can include, but is not limited to, an ocean surface vessel, a rig, a ship, a boat, a yacht, a vehicle, land, or a building. Then from the vessel 230 to a power distribution center 250. In some embodiments, the power distribution center 250 can be on land. In other embodiments, the enclosure 110 can produce electricity from water pressure at ocean depths. In some examples, the system 200 includes, but is not limited to, the enclosure 110, the turbine generator(s) 114, valve(s) 112, transmission gear(s), water pump(s) 122, air compressor(s) 119, storage tank(s) 120, ocean vessel(s) 230, computer(s) 140, motor(s) tube(s), cables, electronics, mounting apparatus, and tethering the unit and sensor(s).

The system 200 can be designed to produce electricity offshore. For example, the vessel 230 can be alternatively configured as a long term ship/rig platform. One or many may be deployed as a part of an electricity producing farm at sea. Operation staff employees can work and live aboard the ship or rig 230. The ship/rig 230 can be deployed miles offshore. It can be connected to a power distribution center 250 on land and or designed to be a re-fueling, electric energy station for ocean going electric ships and vessels. The system 200 can be deployed along the world's coast and along ocean shipping routes as a re-fueling, electric energy station for ocean vessels, ships, aircraft and drones.

Figure 3:
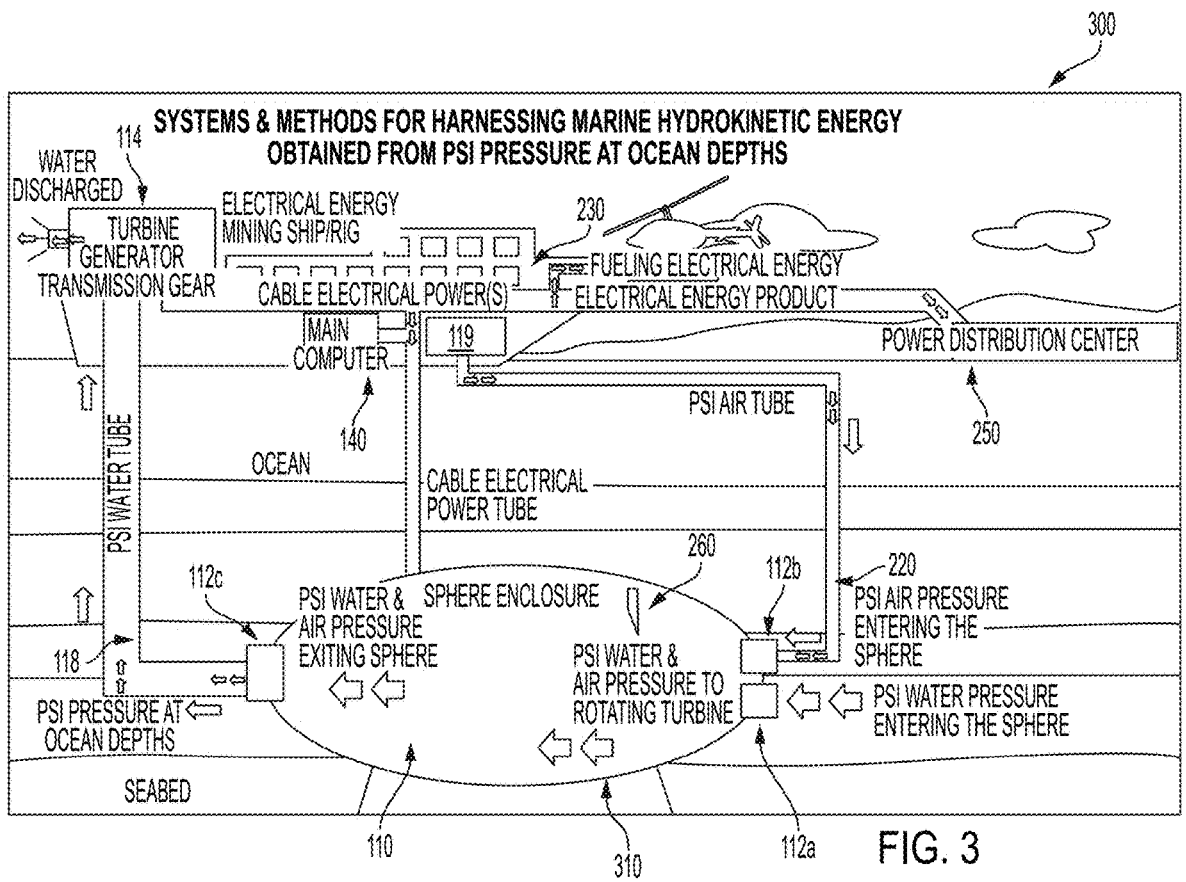
FIG. 3 illustrates another alternate embodiment of an example power system, according to the present disclosure.

FIG. 3 illustrates another alternate embodiment 300 of an example power system, according to the present disclosure. The system 300 comprises a sphere enclosure 110 or any shape enclosure 110 that concludes as a sealed embodiment (device) not to allow high pressure water and or air to escape, except through intake(s) 112a, 112b or outlet(s) 112c or valve(s) that control high pressure water and/or air flow. The sphere enclosure 110 can include one or more main compartments and options for smaller compartments. One compartment can be used to store electronics required for operation. The other compartment can be used for high PSI pressure water flow used to rotate turbine generator blades, which can be located on the vessel 230 at sea surface.

The sphere enclosure 110 can include one or more valves 260 and/or electronics required to operate system 300. Outside the sphere enclosure 110 covering the intake 112a can be optional baffle to prevent wildlife, such as but not limited to, fish, from blocking the intake 112a. Electronics can be placed in a controlled pressurized compartment within the sphere enclosure 110.

An optional tube 220 can be included to move high pressure air from the vessel 230 to the sphere enclosure 110. The air supply can be used to operate the system 300 and regulate the proper PSI pressure in the water flow compartment of the sphere enclosure 110.

High pressure water can enter the sphere enclosure through intake valve(s) 112a and exit on its way to a turbine generator 114 located on vessel 230, at the sea's surface, for distribution to the electrical grid 240 by way of one or more electrical cable(s) 250.

The sphere enclosure 110 can employ one or more stop valves 260 to be used as emergency turn on off lever(s) to control high pressure water flow. Electricity can be produced by connecting high pressure water flow tube(s) 118 to a turbine generator 114 to produce electricity located on the vessel 230. Hydrokinetic energy can be obtained, at least partially, from water pressure at ocean depths.

The enclosure 110 can be mounted to the seabed (ocean floor) and/or tethered to a vessel 230 at the surface.

The system 300 can be deployed in ocean(s), sea(s), river(s), lake(s), manmade lakes(s) and/or any body of water. It can operate in water depths and land holes filled with water at depths.

The system 300 component material can be composed of any suitable material used in the hydrokinetic energy industry. Water PSI, liquids PSI, and/or pressurized air PSI can be used for operations of the embodiments.

The system 300 can employ one or more motors with thrust propulsion used to maneuver the enclosure 110 into proper position to operate at sea depths.

The system 300 can employ one or more air tube(s) 220 connected from the enclosure 110 to the vessel 230 at the water's surface. It can be designed to supply compressed air when required for operations and maintenance.

The system 300, as illustrated in FIG. 3, includes a sphere enclosure 110 with intake(s) 112a for high pressure water to enter at high pressure. The flow of high pressure water can pass through valve(s) 112c, exiting the sphere enclosure 110, through a tube 118 on its way to a turbine generator 114 located on vessel 230 at the surface. Components of the system 300 include, but are not limited to, a sphere enclosure 110, turbine generator(s) 114, transmission gear(s), valve(s) 112, air compressor(s) 119, ocean vessel(s) 230, computer(s) 140, motor(s), tube(s) 118, 220, cables 250, electronics, mounting apparatus 310, and tethering the unit and sensor(s).

The system 300 can be designed to produce electricity offshore utilizing a mobile short-term ship/rig platform 230. Operation staff employees can work and live aboard the ship or rig 230. The ship or rig can be deployed anywhere near the shore in deep waters. In some examples, several ships/rigs can be joined as an electricity producing farm at sea. The turbine 114 can be located on the ship/rig 230. In some examples, the system 300 can be connected to a power distribution center 250 on land and/or the system 300 can be designed to be a re-fueling, electric energy station for ocean going electric ships and vessels. The system 300 can be deployed along any coast and/or along ocean shipping routes as a re-fueling, electric energy station for ocean vessels, ships, aircraft and drones.

Figure 4:
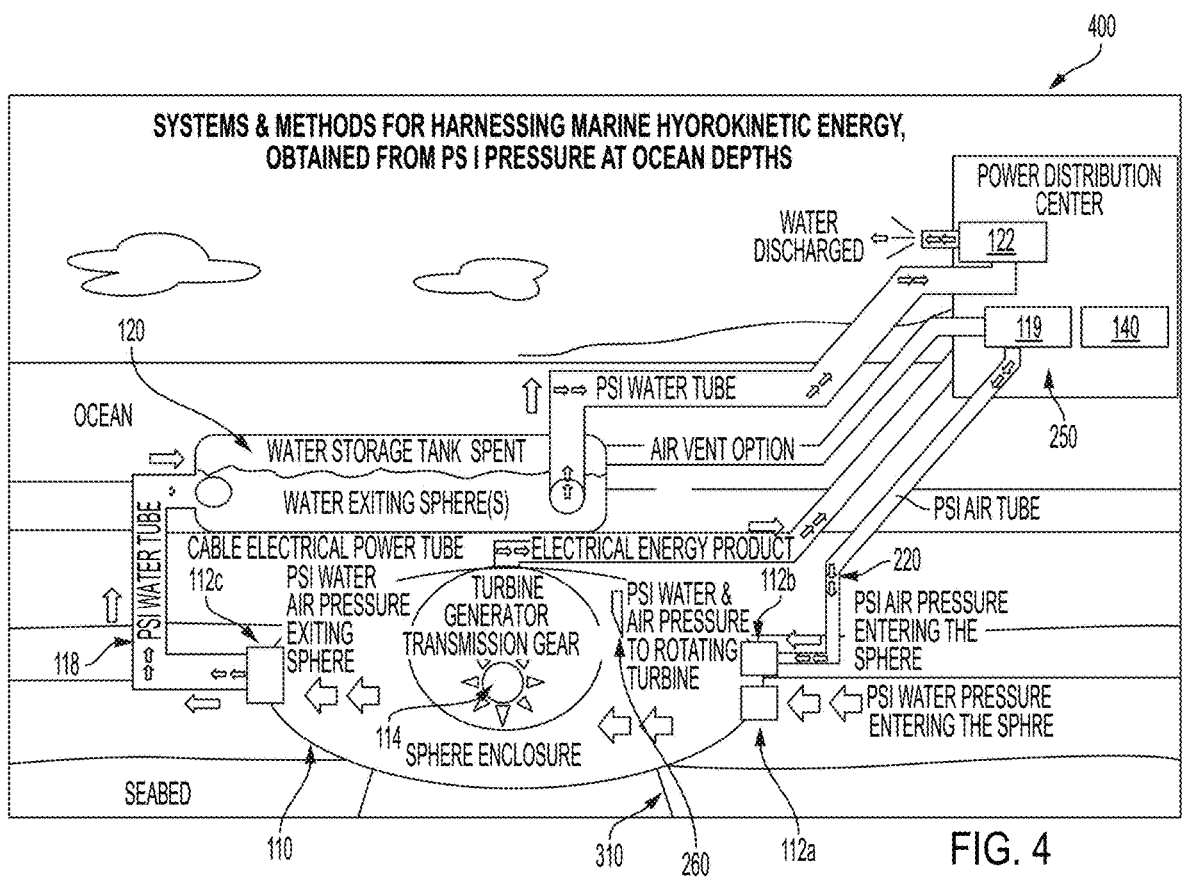
FIG. 4 illustrates another alternate embodiment of an example power system, according to the present disclosure.

FIG. 4 illustrates another alternate embodiment 400 of an example power system, according to the present disclosure. In the illustrated example, high pressure water can enter the sphere enclosure 110 through intake valve(s) 112a and rotate the turbine generator 114 to produce electricity. The electricity can then be sent to land and building(s) for distribution to the electrical grid by way of one or more electrical cable(s)/submarine cable(s) 252.

High pressure water can exit the sphere enclosure 110 through exit valve(s) 112c, it can enter tube(s)/pipe(s) 118 delivering high pressure water to water storage tank(s) 120. Water can then be pumped from the water storage tank 120 to the power distribution center 250 and exit into the ocean. The electrical energy can be delivered from the turbine 114 to a power distribution center 250 or electrical grid 240.

The sphere enclosure 110 can have several options as a build, including, but not limited to, mounted to a seabed, including high pressure air tubes required to operate as a submarine, ballast tank(s), variable ballast tank(s), trim tank(s), vent valve(s), pressure hull and required components to operate as a remotely piloted submarine. It can surface up or descend down to certain sea levels.

The system 400 can be deployed at ocean depths above the seabed or on the seabed. The enclosure 110 can be tethered to land and building(s), such as power distribution centers 250, in order to deliver electrical energy to cities.

The system 400 can be designed to produce electricity near the shore in deep waters. It can be utilized as a long term energy platform. It can be deployed as a part of an electricity producing farm at seashore. Main components can be placed in the power distribution center located on land.

Figure 5:
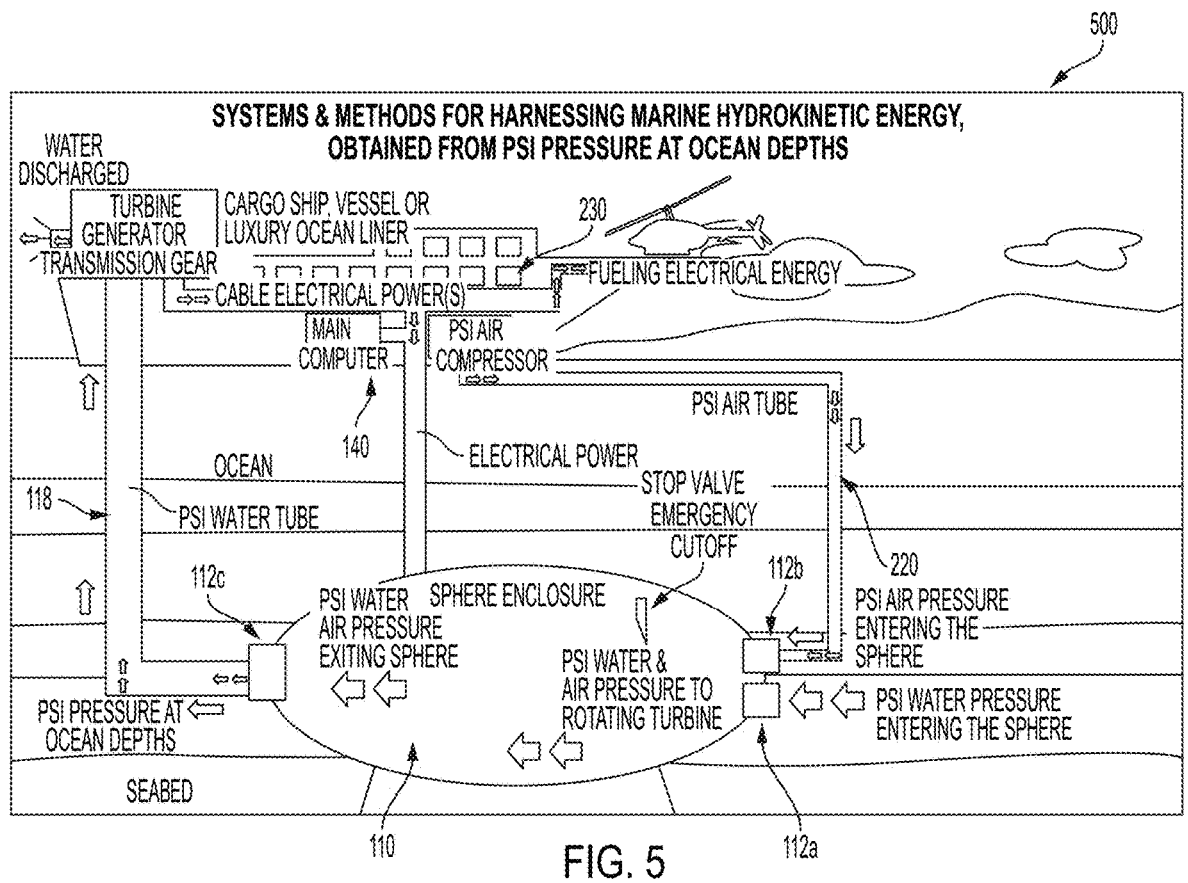
FIG. 5 illustrates another alternate embodiment of an example power system, according to the present disclosure.

FIG. 5 illustrates another alternate embodiment 500 of an example power system, according to the present disclosure.

In the illustrated example of FIG. 5, the sphere enclosure 110 can be tethered to the vessel 230 as a power source while the vessel is stationary or traveling.

The system 500 comprises a sphere enclosure 110, pressure valve(s), computer(s), motor(s), tube(s) 118, cable(s) and/or submarine cable(s), electronics, tether apparatus, and sensor(s). In some examples, the system 500 can produce electrical energy to be stored on vessels and used as a power source.

In some examples, system 500 can be used to produce electricity for ocean liners, cargo ships, aircraft, drones and ocean vessels. In other examples, it can be used as a mobile power producing source for cities, and other entities that require emergency electrical power, short term. Operation staff employees can work and live aboard the ship or rig 230. Ship/rig 230 can be deployed anywhere there are deep waters. When system 500 is not connected to a power distribution center on land, it can be designed to be a re-fueling, electric energy station for ocean going ships, aircraft, drones and vessels. In some examples, system 500 can be deployed along coasts and/or along ocean shipping routes as a re-fueling, electric energy station.

Figure 6:
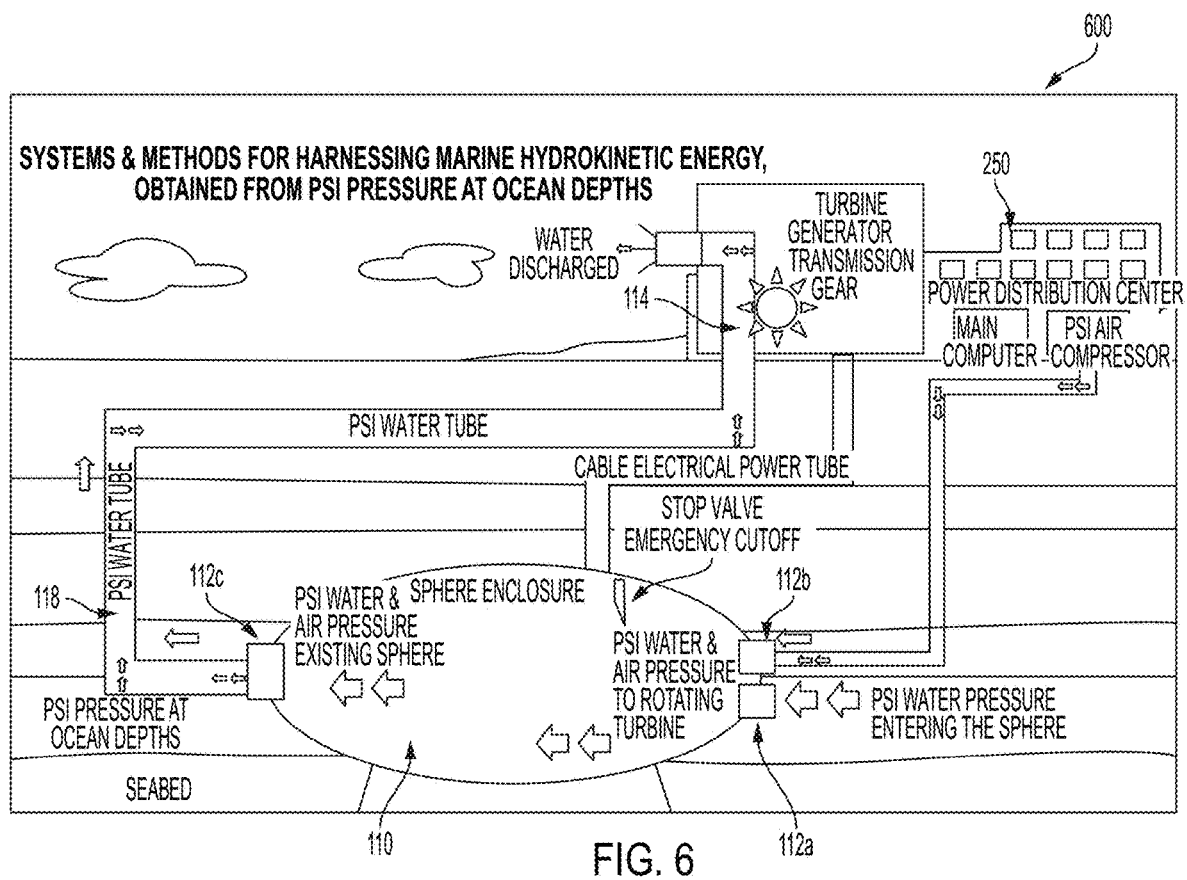
FIG. 6 illustrates another alternate embodiment of an example power system, according to the present disclosure.

FIG. 6 illustrates another alternate embodiment 600 of an example power system, according to the present disclosure. In the illustrated example of FIG. 6, high pressure water can enter the sphere enclosure 110 through intake valve(s) 112a. High pressure water can be sent to a power distribution center(s) 250, turbine generator 114, valve(s) and/or gear boxes, power transmission, computer and/or electronics required to operate the system 600. The power distribution center 250 can be located on land, and used to distribute energy to the electrical grid by way of electrical cable(s) and/or submarine cable(s). High pressure water can exit the sphere enclosure 110 through exit valve(s) 112c, it can enter a tube(s)/pipe(s) 118 delivering high pressure water to power distribution center 250/electrical grid 240.

The enclosure 110 can be deployed at ocean depths above the seabed or on the seabed. The enclosure 110 can be tethered to land and building(s), or power distribution centers 250 in order to deliver electrical energy to an electrical grid. As shown, many of the components of the system 600 can be placed in the power distribution center 250 located on land, and thus no ship or rig is necessary. The enclosure 110 can be deployed under the sea, near the seashore, or in deep waters. The turbine 114 can be located in the power distribution center 250 located on land.

Figure 7:
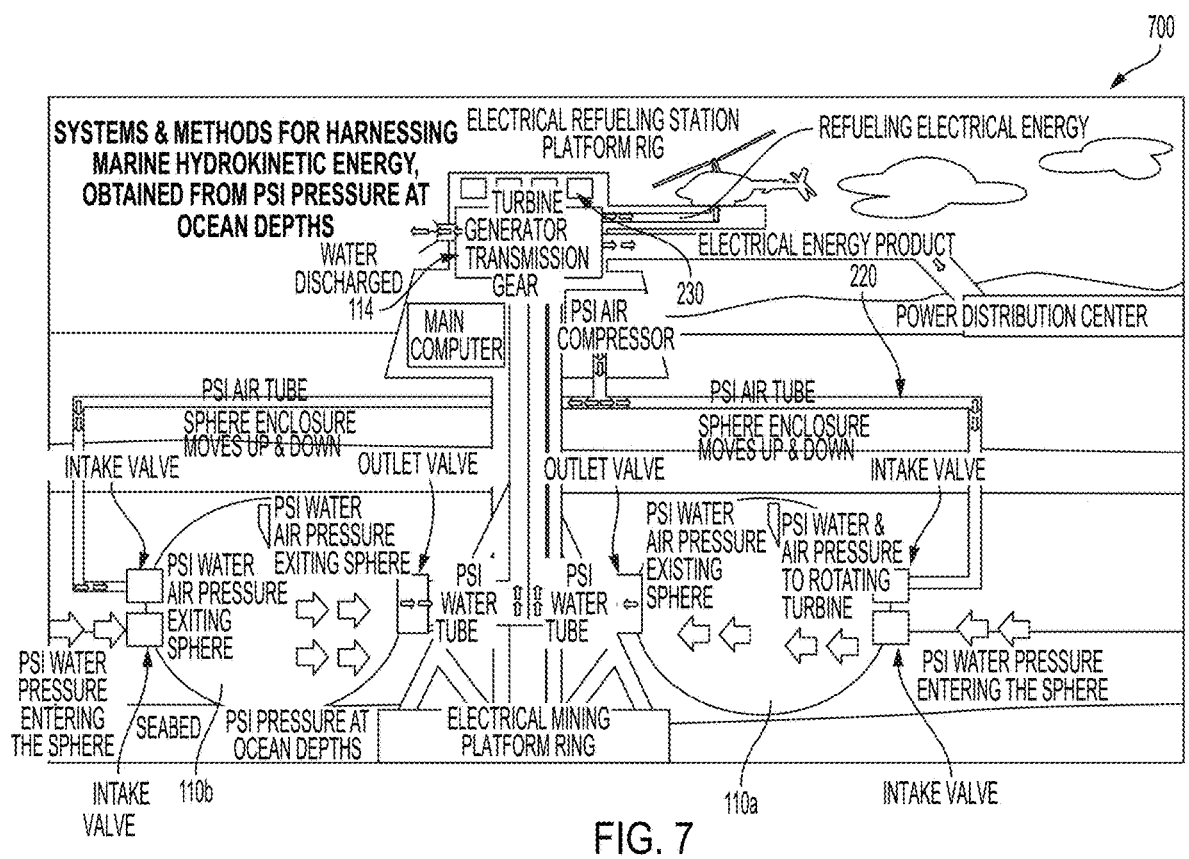
FIG. 7 illustrates another alternate embodiment of an example power system, according to the present disclosure.

FIG. 7 illustrates another alternate embodiment 700 of an example power system, according to the present disclosure. System 700 includes two enclosures 110a, 110b (collectively referred to herein as enclosures 110).

System 700 can optionally include a tube 220 supplying high air PSI pressure from the vessel 230 to the two sphere enclosures 110. The air supply can be used to adjust the water pressure in the two enclosures 110. High pressure water can enter the sphere enclosures 110 through intake valve(s) and exits of the enclosures 110, on its way to the turbine generator 114 located on the vessel 230.

System 700, as illustrated in FIG. 7, can be mounted to an electrical mining platform rig 230 by way of attachment to a vertical structure and operated up and down as a type of elevator for the sphere enclosures 110 to achieve the required depth and PSI pressure. There can be one or more sphere enclosures 110 attached to the electrical mining platform rig 230.

System 700 can be deployed in ocean(s), sea(s), river(s), lake(s), manmade lakes(s) and body of waters, and can operate in water depths and land holes filled with water at depths. It can employ PSI pressure at ocean depths.

System 700 can have an option to use a mechanical mechanism to move the sphere enclosure up to the sea surface and down to the seabed or use motors deployed to move the sphere enclosure up or down while attached to a main tower.

System 700 can be used with oil platforms that may need to be modified. Alternatively, a new electrical mining platform rig 230 can be built from scratch. One or many sphere enclosures 110 can be used system 700. One, two, three, four, five, six or more sphere enclosures can be used to balance and deploy an electrical energy farm at sea.

In some examples, system 700 can be designed to be deployed on modified oil platforms and/or new electrical mining platform rig(s) designed and built from scratch. The main structure can function like an elevator for the sphere enclosures 110. It can move the enclosures up for maintenance and operations. It can move them down for deployment at the required depths. The structure can be designed to support and service more than one attached sphere enclosures. This system 700 can be designed to be a fueling/electric energy station at sea, for electric ships, aircraft, drones and vessels. It can be deployed across the coastal areas and across the ocean, near shipping lanes. It can be connected to a power distribution center on land and or designed to be a re-fueling, electric energy station for ocean going electric ships aircraft, drones and vessels. For example, system 700 can be deployed along the world's coast and along ocean shipping routes as re-fueling, electric energy stations. An optional turbine generator can be placed inside the sphere enclosure. It can supply electric power to ocean cities and outpost.

Figure 8:
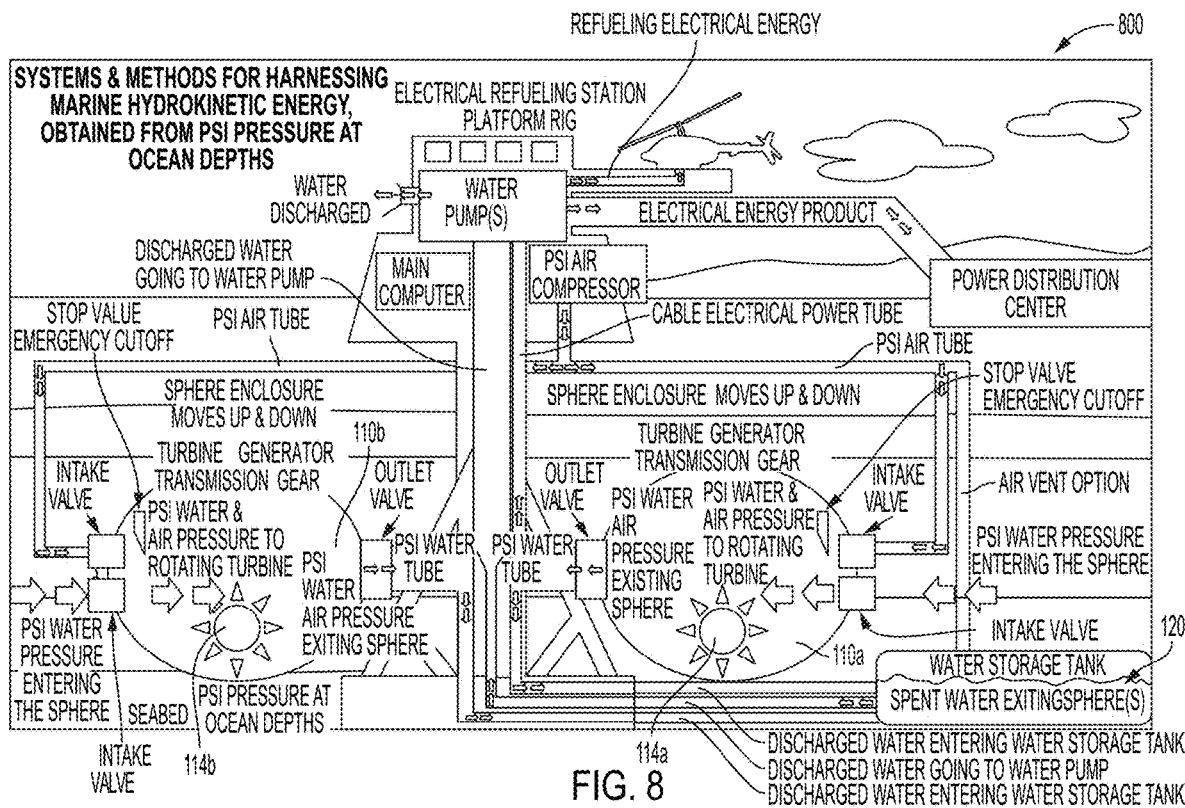
FIG. 8 illustrates another alternate embodiment of an example power system, according to the present disclosure.

FIG. 8 illustrates another alternate embodiment 800 of an example power system, according to the present disclosure. System 800 is similar to system 700. However, system 800 includes turbine generators 114a and 114b inside the enclosures 110a and 110b. Also, system 800 uses the storage tank 120.

Figure 9:
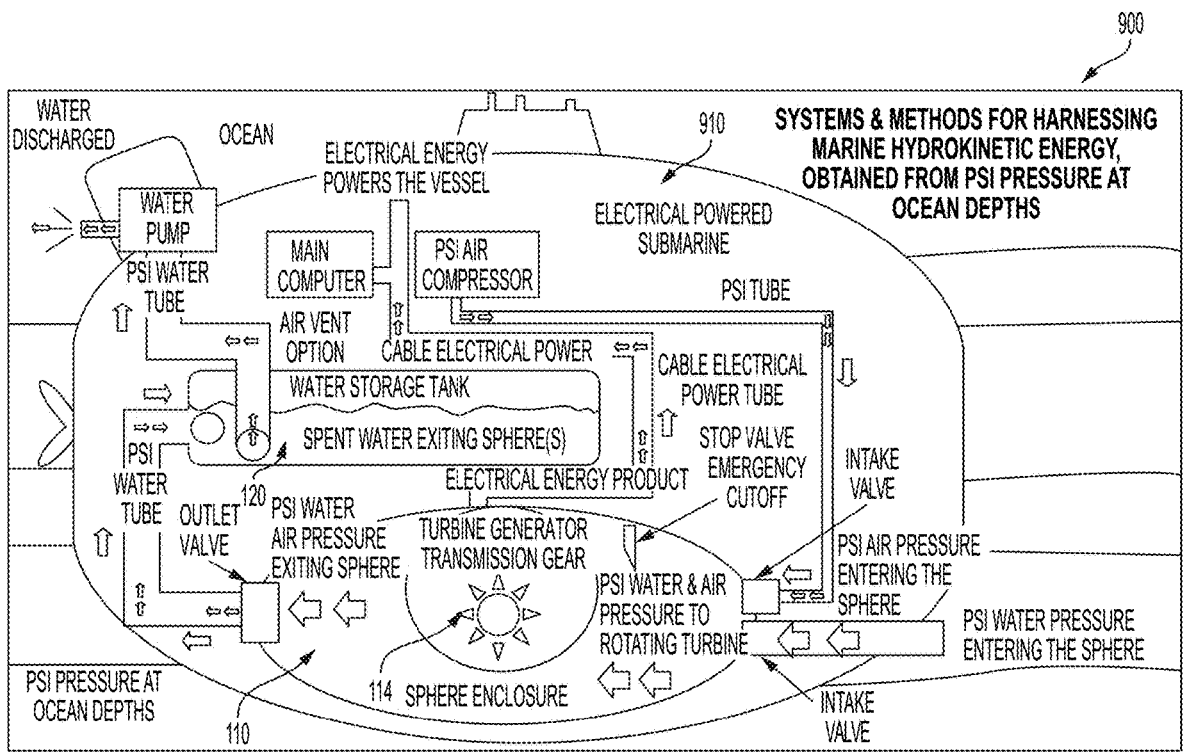
FIG. 9 illustrates another alternate embodiment of an example power system, according to the present disclosure.

FIG. 9 illustrates another alternate embodiment 900 of an example power system, according to the present disclosure. FIG. 9 shows an embodiment of an example power system deployed inside a submarine to power the submarine 910.

Figure 10:
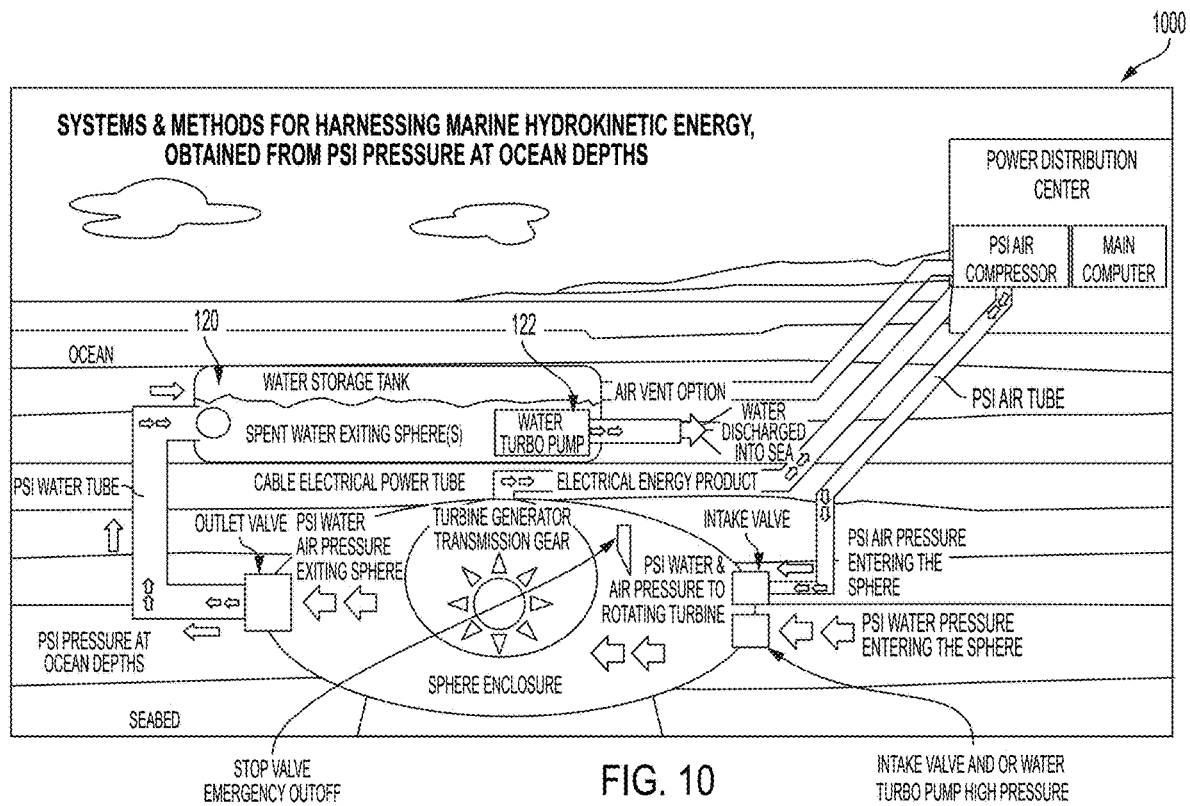
FIG. 10 illustrates another alternate embodiment of an example power system, according to the present disclosure.

FIG. 10 illustrates another alternate embodiment 1000 of an example power system, according to the present disclosure. As shown, system 1000 includes the water pump 122 disposed inside the water storage tank 120.

System 1000 comprises a sphere enclosure or any shape enclosure that houses the embodiment (device) and does not allow high pressure water to escape, except through intake(s) or outlet(s) valve(s) and/or nozzle(s) that control high pressure water flow. The sphere enclosure includes a turbine generator, valve(s) and/or nozzle(s), gear box, power transmission, computer, and electronics required to operate system 1000. In some embodiments, system 1000 further comprises a PSI water tube, a water storage tank, and a water turbo pump.

In some embodiments, the water turbo pump can be placed inside the water storage tank, near the water storage tank, or outside the water storage tank. In other embodiments, the water turbo pump can discharge water into the sea depths at a higher PSI pressure level than the sea depth PSI pressure level deployed. System 1000 can use pressurized air and gas to move water through the tubes into a sphere enclosure. This can result in extreme PSI pressure that propels a turbine generator and/or one or more turbine generator blade(s), creating continual electrical energy for its power storage or distribution center.

In other embodiments, in addition to pressurized air and gas, pressurized water is also used to move water through the tubes into a sphere enclosure. This can result in extreme PSI pressure that propels a turbine generator, creating continual electrical energy for its power storage or distribution center. The entire energy system can receive operational power from its turbine generator(s), power storage unit(s), battery, and/or batteries, a combination thereof or the like.

High pressure water can enter the sphere enclosure through intake valve(s) and/or nozzle(s) and rotate the turbine generator and/or one or more turbine generator blade(s) to produce electricity. The electricity can then be sent to land and building(s) for distribution to the electrical grid by way of one or more electrical cable(s) and/or submarine cable(s).

The sphere enclosure can include stop valve(s) to be used as emergency turn on/off lever(s) controlling high pressure water flow. The electricity can be produced by hydrokinetic energy obtained from water pressure at ocean depths.

High pressure water can exit the sphere enclosure through exit valve(s) and/or nozzle(s), it can enter tube(s) and or pipe(s) delivering high pressure water to water storage tank(s). Water can then be pumped from the water storage tank to the power distribution center and exit into the ocean. The electrical energy can be delivered from the turbine to a power distribution center electrical grid.

Figure 11:
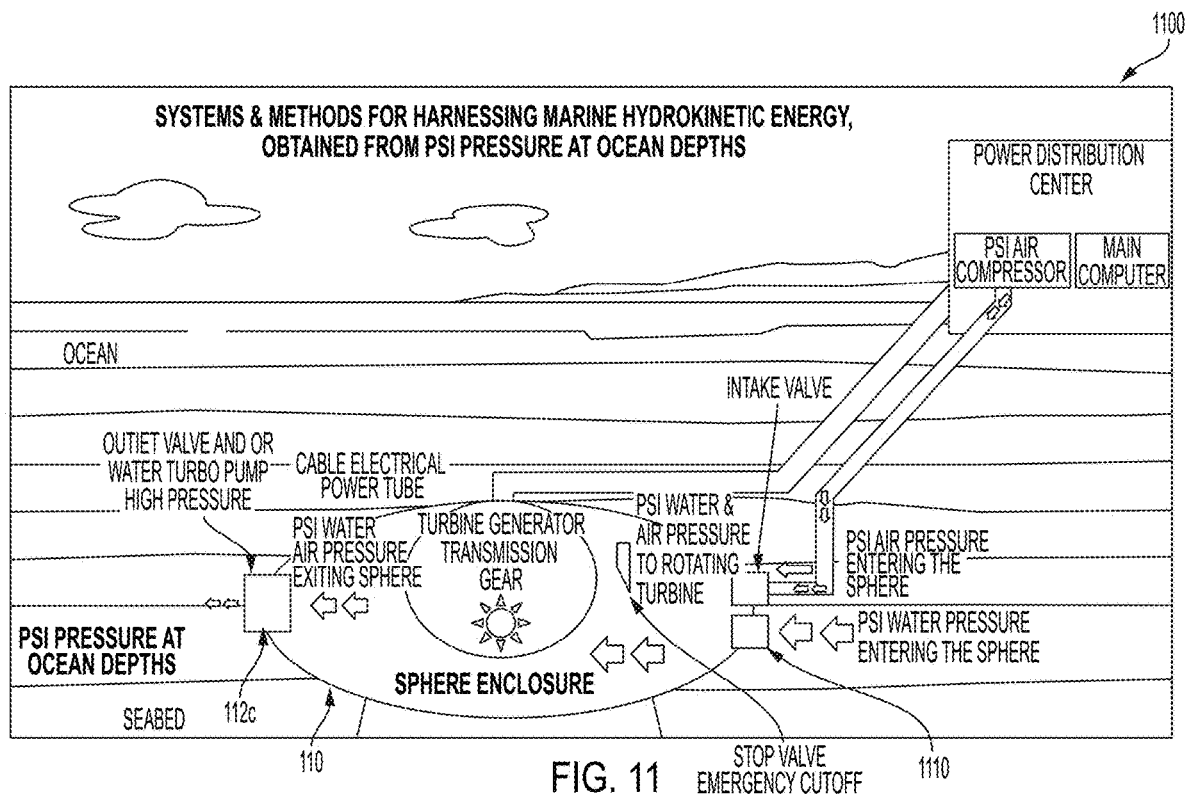
FIG. 11 illustrates another alternate embodiment of an example power system, according to the present disclosure.

FIG. 11 illustrates another alternate embodiment 1100 of an example power system, according to the present disclosure. In the illustrated example, system 1100 comprises a water turbo pump 1110 disposed inside an intake port of the enclosure 110. In other embodiments, the water turbo pump 1110 can be placed inside the sphere enclosure 110, at an outlet/output valve(s) and/or nozzle(s) 112c of the sphere enclosure 110, near an outlet/output valve(s) and/or nozzle(s) 112c of the sphere enclosure 110, or outside the sphere enclosure 110. In some embodiments, there is a water turbo pump 1110 in place of an outlet/output valve and/or nozzle 112c. There can be one or more water turbo pump(s) 1110 employed in system 1100. The water turbo pump 1110 can discharge water into the sea depths at a higher PSI pressure level than the sea depthThe sphere enclosure can include stop valve(s) to be used as emergency turn on off lever(s) controlling high pressure water flow. The electricity can be produced by hydrokinetic energy obtained from water PSI pressure at ocean depths.

Figure 12:
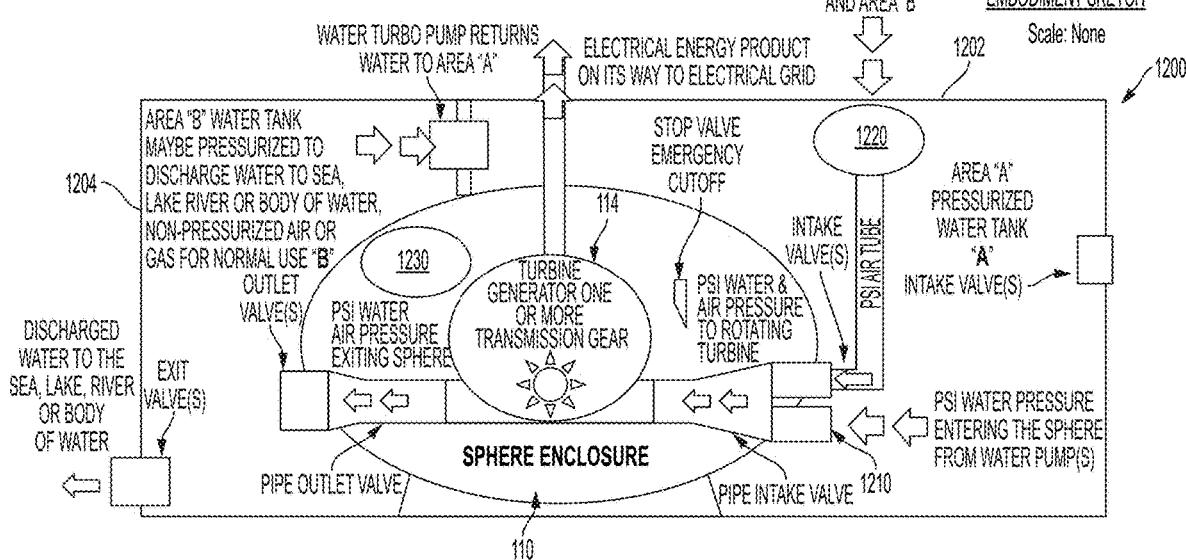
FIG. 12 illustrates another alternate embodiment of an example power system, according to the present disclosure.

FIG. 12 illustrates an example embodiment 1200 of an example power system, according to the present disclosure. Instead of utilizing ocean depth pressure, system 1200 can comprise high pressurized water 1202, pressurized air tank(s) 1220, and/or water turbo pump(s) 1210 to power the enclosure 110.

System 1200 can utilize pressurized air and/or gas, along with pressurized water 1202, to move water through tubes into a sphere enclosure 110, resulting in extreme PSI pressure that can propel a turbine generator 114, creating continual electrical energy for its power storage or distribution center. In some embodiments, the turbine generator includes one or more blade(s) which are rotated to propel the turbine generator 114 and create energy/electricity. Discharged water can be routed to a non-pressurized water tank 1204. The water is then returned to the pressurized air and water tank 1202. The water routing process can then start over. The entire energy system can receive operational power from its turbine generator(s) 114, power storage unit(s)/batterie(s) 1230, or combination thereof or the like. In some embodiments, system 1200 can be completely perpetual, except for maintenance and repairs. System 1200 can be deployed nearly anywhere on land or island(s). Land based deployment can result in less government regulations which could be an advantage to utilizing the systems described herein.

In other embodiments, system 1200 can use water, air, gas, and/or a combination therefore. It can further comprise a sealed plate, floating roof or a bladder to receive the air and/or gas, covering the water. The plate and/or bladder can be pushed down onto the water using PSI pressure, hydraulics, and/or pneumatics systems to create very high PSI pressure. There is no limit on creating PSI pressure with the example embodiments described herein. This can allow the pressurized water to enter the sphere enclosure intake valve (s) and/or nozzle(s) and/or water turbo pump 1210 on its way to rotate the turbine generator(s) 114 to produce electricity. In some embodiments, the turbine generator(s) 114 are rotated via blade(s) to produce electricity, e.g. the turbine generator 114 can include one or more blade(s) This setup can include one, two, or more water tanks. Some embodiments, can include pressurized water tank 1202 and non-pressurized water tank 1204. In other embodiments, before pressurized water tank 1202 is empty, water tank 1204 can start service to replenish spent water from pressurized tank 1202. Meanwhile, tank 1204 can start to deliver water into the near empty pressurized water tank 1202. The cycle repeats itself for periods of time. Time can be in minutes, hours, days, etc. In some embodiments, the time depends on the volume of the tanks 1202 and 1204. These systems can deliver high PSI pressure to turbine generators 114.

Advantages of the systems/example embodiments described herein, include a land based power plant, reusable circulating water, an entire power plant being powered by one of the turbine generators, an energy storage unit being used to start a power plant, power plant construction has less regulations and can be deployed anywhere on land, energy system can be completely perpetual, except for maintenance and repairs, not affected by cold, hot or other weather extremes, can be used to provide broadband internet service to remote locations, and no carbon footprint is left behind.

Figure 13:
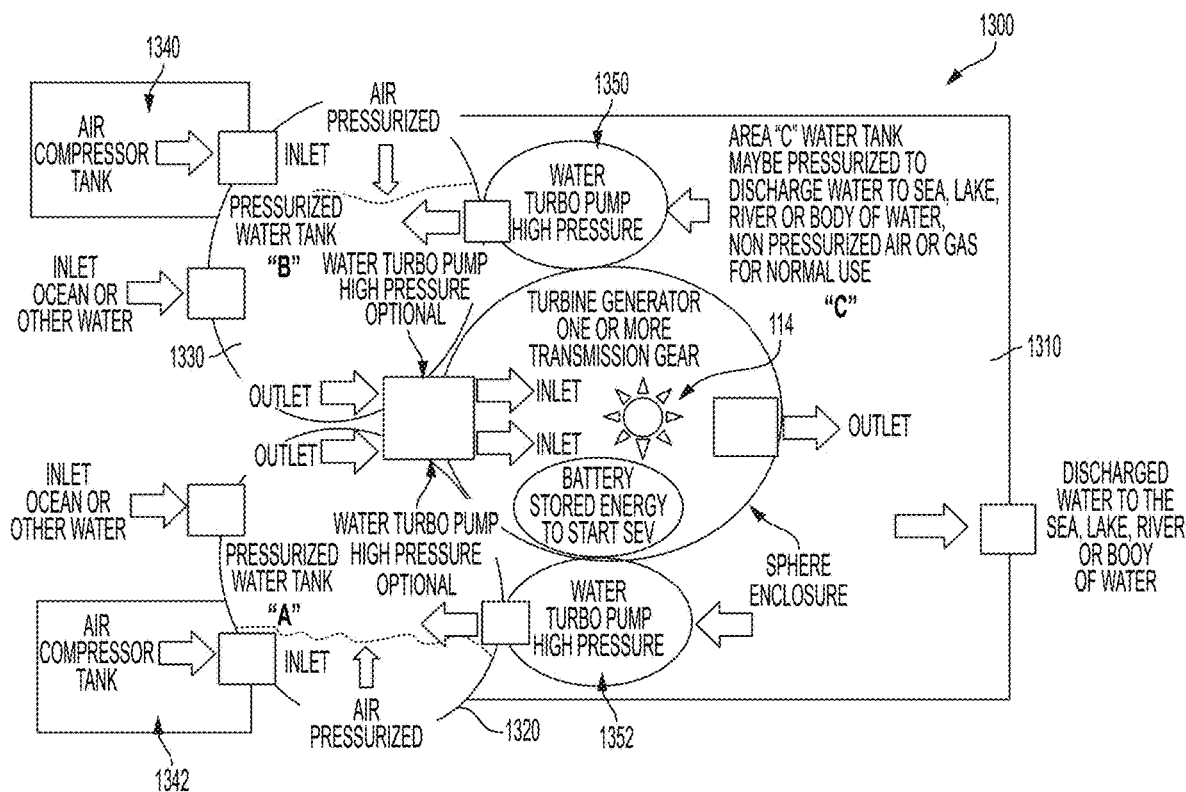
FIG. 13 illustrates another alternate embodiment of an example power system, according to the present disclosure.

FIG. 13 illustrates an alternative embodiment 1300 of an example power system, in accordance with the present disclosure. In some embodiments, system 1300 is deployed anywhere on land, i.e. the ocean is not required. It can include one or more water tank(s) 1310, 1320, 1330 inside a renewable energy power plant. In other embodiments, instead of ocean depth pressure, the example embodiment can use high pressurized water, one or more pressurized air tank(s) 1340, 1342, and/or one or more water turbo pump(s) 1350, 1352 to power the embodiment.

System 1300 can utilize pressurized air and/or gas, along with pressurized water, to move water through tubes into a sphere enclosure, resulting in extreme PSI pressure that can propel a turbine generator, creating continual electrical energy for its power storage or distribution center. In some embodiments, the turbine generator(s) 114 is rotated via blade(s) to produce electricity, e.g. the turbine generator 114 can include one or more blade(s). Discharged water can be routed to a non-pressurized water tank, e.g. water tank 1310. The water is then returned to the pressurized air and water tank 1330. The water routing process can then start over. The entire energy system can receive operational power from its turbine generator(s) 114, power storage unit(s), battery, batteries, and/or a combination thereof, or the like. System 1300 can be deployed nearly anywhere on land or island(s).

Land based deployment can result in less government regulations which could be an advantage to utilizing the systems described herein.

In other embodiments, system 1300 can use water, air, gas, and/or a combination thereof. It can further comprise a sealed plate, floating roof or a bladder to receive the air and/or gas, covering the water. The plate and/or bladder can be pushed down onto the water using PSI pressure, hydraulics, and/or pneumatics systems to create very high PSI pressure. There is no limit on creating PSI pressure with the example embodiments described herein. This can allow the pressurized water to enter the sphere enclosure intake valve and/or nozzle(s) and/or water turbo pump on its way to rotate the turbine generator(s) to produce electricity. In some embodiments, the turbine generator(s) are rotated via blade(s) to produce electricity, e.g. the turbine generator can include one or more blade(s). This setup can include one, two, or more water tanks. Some embodiments, can include water tanks 1320, 1330, and 1310. In other embodiments, before water tank 1310 is empty, water tank 1330 can start service and take the place of water tank 1310 by delivering water into the sphere enclosure intake valve(s) and/or nozzle(s) and/or water turbo pump on its way to rotate the turbine generator(s) 114 to produce electricity. In some embodiments, the turbine generator(s) are rotated via blade(s) to produce electricity, e.g. the turbine generator can include one or more blade(s). Water discharged from the sphere enclosure can be routed to water tank 1310. In some embodiments, if needed water in water tank 1310 can send the discharged water to replenish spent water from tank 1320 and tank 1330 through a water turbo pump. In some embodiments, water tank 1320, water tank 1330, and/or water tank 1310 can be pressurized. Meanwhile, tank 1330 can start to deliver water into the near empty pressurized water tank 1320. The cycle can repeat itself for periods of time. Time can be in minutes, hours, days, etc. In some embodiments, the time depends on the volume of the tanks. These systems can deliver high PSI pressure to turbine generators.

Advantages of the systems/example embodiments described herein, include a land based power plant, reusable circulating water, an entire power plant being powered by one of the turbine generators, an energy storage unit being used to start a power plant, power plant construction has less regulations and can be deployed anywhere on land, energy system can be completely perpetual, except for maintenance and repairs, it is not affected by cold, hot or other weather extremes, it can provide broadband internet service to remote locations, and leaves no carbon footprint behind.

In some examples, the sphere enclosure ocean PSI pressure at intake valve and/or nozzle can employ Penstock Pipe 120 in (10 ft) Diameter.

The preceding disclosures are illustrative embodiments. It should be appreciated by those of skill in the art that the devices, techniques and methods disclosed herein elucidate representative embodiments that function well in the practice of the present disclosure. However, those of skill in the art should, in light of the present disclosure, appreciate that many changes can be made in the specific embodiments that are disclosed and still obtain a like or similar result without departing from the spirit and scope of the invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects those of ordinary skill in the art to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Further, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A system comprising:
   an enclosure submerged in a body of water;
   an intake port disposed along a periphery of the enclosure to transport water into the enclosure;
   a turbine generator disposed inside the enclosure and coupled to the intake port to receive the water entering the enclosure through the intake port;
   a water storage tank disposed outside the enclosure and coupled to the turbine generator to receive the water flowing out of the turbine generator;
   a pump coupled to the water storage tank to pump the water out of the water storage tank;
   a controller to control flow of the water into the enclosure by operating the intake port and to control flow of the water out of the enclosure by operating the pump;
   a discharge port disposed along the periphery of the enclosure to transport water out of the enclosure, wherein the water storage tank is coupled to the discharge port to receive the water flowing out of the enclosure and through the discharge port; and
   a tube coupled to the discharge port and extending away from the discharge port to define a channel for transporting the water from the discharge port to the water storage tank.

2. The system of claim 1, wherein the intake port is a first intake port, the system further comprising:
   a second intake port disposed along the periphery of the enclosure to transport compressed air into the enclosure, wherein the second intake port is coupled to the turbine generator to adjust water pressure of the water flowing from the first intake port into the turbine generator.

3. The system of claim 2, further comprising:
   an air compressor coupled to the second intake port to provide the compressed air entering the enclosure.

4. The system of claim 3, wherein the air compressor is disposed outside the body of water in which the enclosure is submerged.

5. The system of claim 1, further comprising:
   a buoyancy structure disposed at the water storage tank; and
   an air pump coupled to the buoyancy structure.

6. The system of claim 5,
   wherein the controller is configured to increase, by operating the air pump to pump air into the buoyancy structure, a buoyancy force exerted on the water storage tank to cause the water storage tank to move upwards toward a surface of the body of water, and
   wherein the controller is configured to increase flow of the water pumped out of the water storage tank in response to the water storage tank moving upwards to at least a threshold depth level from the surface of the body of water.

7. The system of claim 1, wherein the controller is configured to adjust flow of the water pumped out of the water storage tank by the pump based on a tidal phase of the body of water at a location of the water storage tank.

8. The system of claim 1, further comprising:
   a pressure sensor disposed at or near the water storage tank to provide pressure measurements of water pressure outside the water storage tank, wherein the controller is configured to adjust flow of the water pumped out of the water storage tank by the pump based on the pressure measurements.

9. The system of claim 1, further comprising:
   a plurality of ports disposed along the periphery of the enclosure and oriented in a plurality of directions relative to the body of water surrounding the enclosure, wherein the intake port is one of the plurality of ports.

10. The system of claim 9, further comprising:
    a piping mechanism disposed in the enclosure and coupled to the plurality of ports, wherein the controller is configured to selectively connect an input of the turbine generator to one of the plurality of ports of the enclosure by operating the piping mechanism.

11. The system of claim 10, wherein the controller is configured to select the intake port from the plurality of ports based on a direction of an underwater current outside the enclosure.

12. The system of claim 11, further comprising:
    a sensor disposed at or near the enclosure to provide measurements indicative of the direction of the underwater current, wherein the controller selects the intake port and operates the piping mechanism based on the measurements by the sensor.

13. A system comprising:
    an enclosure submerged in a body of water;
    first intake port disposed along a periphery of the enclosure to transport water into the enclosure;
    a turbine generator disposed inside the enclosure and coupled to the intake port to receive the water entering the enclosure through the intake port;
    a discharge port disposed along the periphery of the enclosure to transport the water exiting the turbine generator out of the enclosure;
    a controller to control flow of the water into the enclosure by operating the intake port; and
    a second intake port disposed along the periphery of the enclosure to transport compressed air into the enclosure, wherein the second intake port is coupled to the turbine generator to adjust water pressure of the water flowing from the first intake port into the turbine generator.

14. The system of claim 13, further comprising:
    a pump coupled to the discharge port to pump the water out of the enclosure through the discharge port, wherein the controller is configured to control flow of the water out of the enclosure by operating the discharge port.

15. The system of claim 13, further comprising:
    an air compressor coupled to the second intake port to provide the compressed air entering the enclosure.

16. The system of claim 15, wherein the air compressor is disposed outside the body of water.

* * * * *